United States Patent
Preimesberger et al.

(10) Patent No.: US 12,039,088 B2
(45) Date of Patent: Jul. 16, 2024

(54) SIGNING FILES BASED ON FILE SECURITY CREDENTIALS

(71) Applicant: HEWLETT PACKARD ENTERPRISE DEVELOPMENT LP, Houston, TX (US)

(72) Inventors: Lee A. Preimesberger, Houston, TX (US); Matthew Bra Kocurek, Houston, TX (US); Robert George Lake, Jr., Houston, TX (US); John Denardo, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 280 days.

(21) Appl. No.: 17/362,595

(22) Filed: Jun. 29, 2021

(65) Prior Publication Data
US 2022/0414266 A1 Dec. 29, 2022

(51) Int. Cl.
G06F 21/64 (2013.01)
G06F 21/62 (2013.01)

(52) U.S. Cl.
CPC .......... *G06F 21/64* (2013.01); *G06F 21/6209* (2013.01)

(58) Field of Classification Search
CPC .............................. G06F 21/64; G06F 21/6209
See application file for complete search history.

(56) References Cited

U.S. PATENT DOCUMENTS

| | | | |
|---|---|---|---|
| 7,340,607 B2 | 3/2008 | Abhyankar et al. | |
| 8,572,368 B1 | 10/2013 | Deacon | |
| 8,667,593 B1 * | 3/2014 | Shnitzer | G06F 21/564 726/22 |
| 9,202,057 B2 | 12/2015 | Mao et al. | |
| 9,917,844 B2 | 3/2018 | Fossen et al. | |
| 10,642,976 B2 | 5/2020 | Spurlock et al. | |
| 10,659,439 B2 | 5/2020 | Sprague et al. | |
| 11,533,185 B1 * | 12/2022 | Sharma | H04L 9/3263 |
| 2012/0331088 A1 * | 12/2012 | O'Hare | H04L 67/1097 709/214 |
| 2015/0278024 A1 | 10/2015 | Barman et al. | |
| 2016/0197831 A1 * | 7/2016 | De Foy | H04L 45/7453 370/392 |
| 2019/0007212 A1 * | 1/2019 | Neve de Mevergnies | H04L 9/3226 |
| 2020/0034050 A1 * | 1/2020 | Brasfield | G06F 12/084 |
| 2022/0327216 A1 * | 10/2022 | Chin | G06N 3/08 |

OTHER PUBLICATIONS

Ramzan, Z. et al., "Reputation-based Security," 2010, https://docs.broadcom.com/doc/reputation-based-security-en.

* cited by examiner

*Primary Examiner* — Shin-Hon (Eric) Chen
*Assistant Examiner* — Vladimir I Gavrilenko
(74) *Attorney, Agent, or Firm* — Trop, Pruner & Hu, P.C.

(57) ABSTRACT

Examples described herein relate to signing of files based on file security credentials. A signing request for a file is received from a file author device. The signing request may include a file identifier associated with the file and a first key identifier associated with a first key stored in a hardware security module (HSM). File security credentials associated with the file may be obtained from one or more file security databases using the file identifier. A file security value for the file may be determined based on the file security credentials. On determining that the file security value satisfies a predetermined first key criteria, the file may be signed using the first key.

20 Claims, 6 Drawing Sheets

SIGNING FILES BASED ON FILE SECURITY CREDENTIALS

BACKGROUND

Code signing is a process of digitally signing a file (e.g., an application file) using a digital certificate to verify the integrity and authorship of the file. The digital certificate is issued by a trusted entity (e.g., a certificate authority) that provides a guarantee that the file has not been corrupted or tampered with by a third party (e.g., a malicious hacker) after it was digitally signed. A file author (e.g., a software publisher) may use code signing for a file and obtain a "signed file", which includes the digital certificate, before publishing it on a server. A client user may download the signed file from the server on a computing device (e.g., a client device) and verify the identity of the file author based on the digital certificate before installation and execution. If the verification is unsuccessful, then the client device may cancel the download, installation, and/or execution, of the file.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Throughout the drawings, identical reference numbers may designate similar, but not necessarily identical elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the terms "includes," "including," "comprises," "comprising," "have," or "having" when used in this disclosure specifies the presence of the stated elements, but do not preclude the presence or addition of other elements.

In the following detailed description, reference is made to the accompanying drawings which form a part hereof, and in which is depicted by way of illustration specific examples in which the present disclosure may be practiced. It is to be understood that other examples may be utilized, and structural or logical changes may be made without departing from the scope of the present disclosure.

As used herein, the term "signing" may refer to code signing as described above. The term "signing system" may refer to a server system providing compute and storage resources, capable of signing a file received from a file author. The term "file" may refer to a computing resource capable of storing data or instructions. Examples of a file may include an executable, a document, a message, an image, a video, or the like. The term "file author" may refer to an individual, a group of individuals, an organization, that may develop, create, and/or author a file.

The signing system may receive a signing request for a file from a file author. The signing system may digitally sign the file using cryptographic keys (hereinafter referred to as "keys"). The keys may be stored in a hardware security module (HSM), which is a tamper-proof hardware device, providing key management services. The HSM may facilitate a secure environment to prevent access to, visibility, or theft of the keys stored therein, from external components. The key management services may include generating keys, storing keys, and performing cryptographic operations, such as encryption and decryption. The HSM may be coupled to the signing system, which may include machine-executable instructions for enforcing the key management services in the HSM.

The file author may receive a signed file from the signing system in response to the signing request. The signed file may include a digital certificate for verifying the authorship of the file. The digital certificate may be issued by a trusted third-party entity, such as a certificate authority (CA), which authenticates the identity information and verifies the ownership of a public key of the file author. Further, the file author may publish the signed files on a server computing system for allowing access and download by one or more client devices. The server computing system may refer to a server system that may be deployed in a datacenter environment for executing one or more files. The server computing system may also refer to a storage system that is deployed in the datacenter environment for storing data associated with the files. The client devices may include one or more computing devices that are connected to the server computing device over a network. A client user or a customer operating the client device may download the signed files from the server computing system. The client device may, based on the digital certificate, verify that the signed file has not been modified and has a trusted file author before installation and execution. Therefore, signing files allows file authors to provide a guarantee of the integrity and authorship of files published for the client users.

Generally, an organization involved in creating and developing files (e.g., software files) may use such signing techniques to ensure their client users can verify and install signed files and avoid the download or installation of spurious versions of those files. Such an organization may use the signing system as part of the organization's network, e.g., an enterprise network, or use a trusted signing service provider facilitated by a remote computing system. The signing system may be used by the organization for signing each file before shipping it out to the client users. The files may be signed using one or more keys, which may be used by authorized members of the organization.

To ensure that every file that is shipped out to client users is signed, several members (e.g., file authors) of the organization may be authorized to make signing requests to the signing system. However, allowing several members of an organization to sign files may lead to a high volume of signing requests, which may involve certain challenges. For instance, tracking the nature of each signing request and detecting erroneous signing requests may be tedious.

An erroneous signing request may refer to a signing request for a file, which may not be intended or ready to be published for client users to download and install on the client device. For example, a signing request may be received for a file of low quality or low importance. The quality of a file may be associated with the types of reviews performed on the file. The type of reviews may include security reviews, functional reviews, and the like. The security reviews may include scanning the files for security threats and may include scanning for malware or virus. The functional reviews may include checking whether a file is ready to execute and function as intended and may include debugging, testing, for example. Examples of a low quality file may include a computer program file that is not checked for bugs or errors, an application file that is not scanned for viruses, or a containerized application file that is not fully developed for execution in a production environment, etc. Such low quality files may not be ready to be published on the server. Further, some files may have high importance as they may be published for a plurality of client users and may have high business value. For example, an operating system update file to be released may be associated with high importance. Other files, such as a hobby project, a document used internally in the organization, etc., may be associated with low importance. Such low importance files may not be intended to be published on the server.

Further, some keys may be more valuable (also referred to as "high-value keys") than other keys. The value of a key may be understood in terms of the types of files the key is used for signing. A high-value key may be intended to sign files having high quality or importance. For example, an authorized member may be trusted to make requests to sign a firmware file or operating system update file with a high-value key. But the organization may not be able to detect if the authorized member makes an erroneous signing request to sign a file, such as a hobby project file, having relatively low quality or low importance with a high-value key.

Additionally, there may not be a mechanism to prevent an authorized member from signing a file of low quality or low importance using a high-value key. For instance, if a member is authorized to use a high-value key (e.g., Authenticode keys), which is used for signing official applications, then there may not be a technique to prevent the authorized member from signing a trivial file or a file of low quality using that key. Moreover, if a trivial or low-quality file is signed with a high-value key and accidentally shipped out to client users, then it may indicate that high-value keys have been misused or compromised. Further, the high-value keys may need to be revoked and each of the shipped files signed with that key may be invalidated. In another case, a suspicious file (e.g., malware) may be signed by an unscrupulous or unauthorized member using one or more high-value keys and shipped out.

Typically, an organization may attempt to address the above challenges by training the authorized members to sign only the files associated with high importance and/or files with sufficient quality to be published for client users. However, such an approach is error-prone because authorized members may need to manually check and test the file quality. The authorized members are trusted to manually decide which files to sign and use the keys for signing files having sufficient quality. Due to the large output of files produced by an organization for signing and publishing, manually auditing each signing request may be labor-intensive and errors may not be detected unless they are noticed by client users.

To that end, the examples described herein provide an automated management of the code signing process. In accordance with aspects of the present disclosure, signing files based on file security credentials is presented. In some examples, a signing request for a file is received from a file author. The signing request may include a file identifier associated with the file and a first key identifier associated with a first key stored in a hardware security module (HSM). File security credentials associated with the file may be obtained from one or more file security databases using the file identifier. A file security value for the file may be determined based on the file security credentials. On determining that the file security value satisfies a predetermined first key criteria, the file may be signed using the first key in the HSM.

As will be appreciated, examples presented herein facilitate an enhanced code signing process that allows automated signing of files. The code signing process ensures only trustworthy files are signed before shipping out or publishing on a server. Examples described herein may ensure that high-value keys are not used for signing low-quality files, thereby avoiding misuse of expensive and important keys. Examples described herein may allow or reject one or more signing requests based on the file security value with reduced manual intervention. Further, the examples described herein may provide feedback for improving the file security credentials, thereby enhancing the file quality before shipping the file to client users. Moreover, the examples presented herein may provide suggestions to select alternate keys matching the file security credentials associated with a given file.

Figure 1:
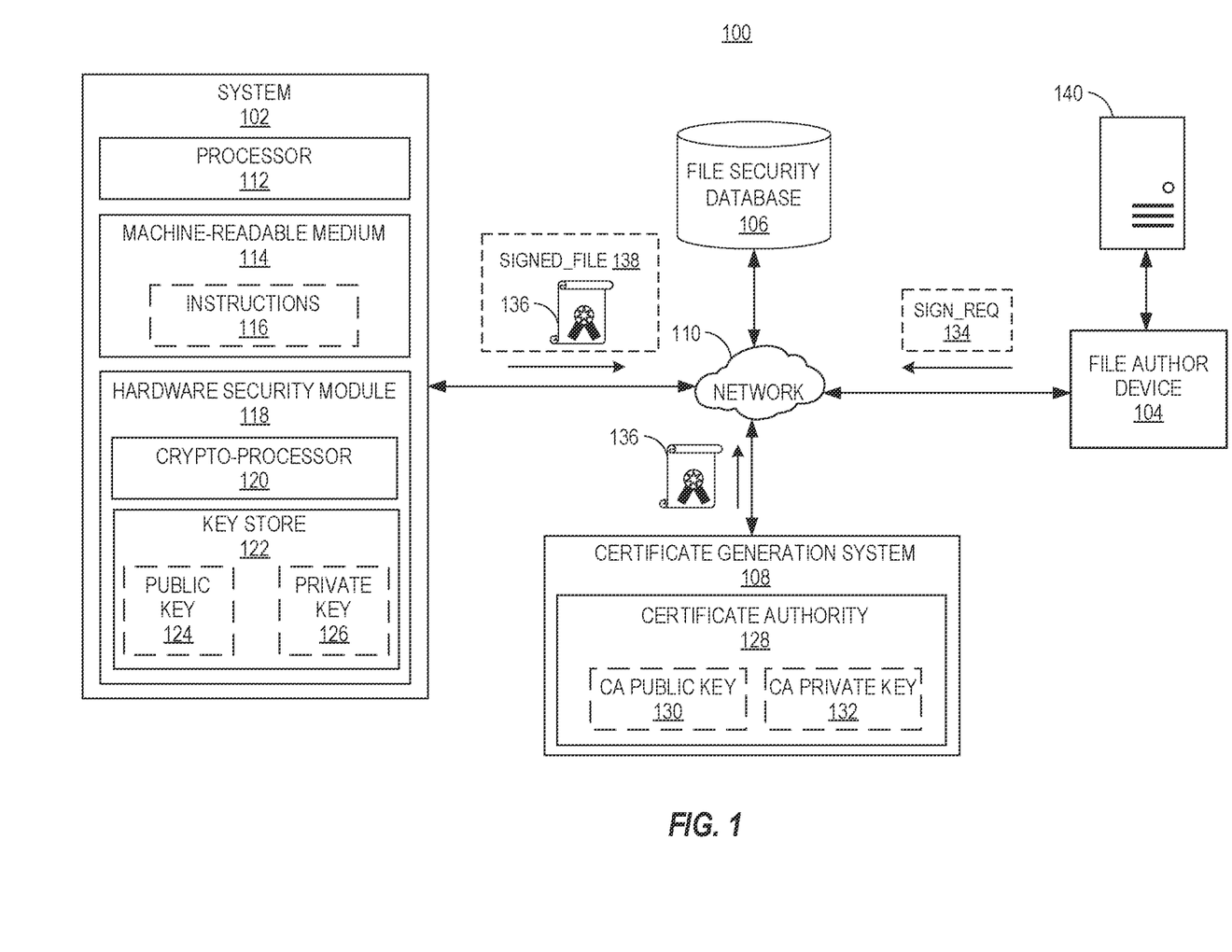
FIG. 1 depicts a network system including a signing system facilitating signing of files based on file security credentials, in accordance with an example.

Referring now to the drawings, in FIG. 1, a network system 100 is depicted, in accordance with an example. The network system 100 may include a system 102, which may also be referred to as signing system 102. The network system 100 may also include a file author device 104, a file security database 106, and a certificate generation system 108 coupled to the system 102 via a network 110.

The file author device 104 may be a device or a system facilitating various file creation and development, compute, and/or data storage services. The file author device 104 may be operated by a file author, for example. A file may refer to a computing resource capable of storing data or instructions. Examples of a file may include an executable, a document, a message, an image, a video, and the like. Data associated with the files, such as file security and quality data (e.g., file security credentials described further below), may be stored in the file security database 106. The file security and quality data may indicate a history of reviews performed on the file. The file security database 106 may store file security and quality data of the files for one or more file author devices 104. The file security database 106 may receive queries from other systems (e.g., system 102) for obtaining file security credentials associated with the files.

The system 102 may include a processor 112, a machine-readable medium 114 including (e.g., encoded with) instructions 116. The system 102 may further include a hardware security module (HSM) 118, which is a physical device facilitating compute, storage, and management of cryptographic services. The HSM 118 may include a crypto-processor 120 and a key store 122 for performing cryptographic operations, such as encryption, decryption, hashing, and the like. The key store 122 may store keys owned by one or more key owners. Additionally, the key store 122 may store the key owner identity information associated with the stored keys. In various examples, a key owner may authorize a file author operating the file author device 104 to use the keys.

In some examples, the processor 112 may receive a request, such as signing request 134 (labeled as SIGN_REQ) from the file author device 104, for digitally signing a file. The signing request 134 may include a signing request specification. The signing request specification may include a file identifier associated with the file and a key identifier associated with a key stored in the HSM 118. The signing request specification will be described further in relation to FIG. 2. The processor 112 may obtain file security credentials associated with the file from one or more file security databases 106 using the file identifier. The file security credentials may include security-related data of the file that indicates the trustworthiness of the file. In some examples, the file security credentials may include malware scan certification, virus scan certification, secure build server certification, a file name, a file size, a file extension, etc. A malware scan certification may indicate that the file has been scanned for malware. A virus scan certification may indicate that the file has been scanned for virus. A secure build server certification may indicate that the file is a product developed on a secure build service or a server. Other properties of the file that include file name, file size, file extension, etc., may also serve as file security credentials.

The processor 112 may determine a file security value for the file based on the file security credentials. In some examples, a security value may be assigned for each file security credential. The security value may be a predetermined value associated with a file security credential. The predetermined values for each security credential may be stored in the machine-readable medium 114, for example. The overall file security value for the file may be calculated based on the individual security values for each file security credential (as will be described further in relation to FIG. 5A).

The processor 112 may determine whether the file security value satisfies a predetermined key criteria associated with the key. The predetermined key criteria may be stored in the machine-readable medium 114, for example. In some examples, the predetermined key criteria may include one or more security and quality measures to assess whether a file may be signed with the key specified in the signing request 134. The security and quality measures may indicate a minimum requirement of file security value to allow the file to be signed with the key.

The processor 112 may sign the file using the key based on the key identifier indicated in the signing request 134 if the file security value satisfies the predetermined key criteria. For example, the processor 112 may send a request including the key identifier and the file identifier (e.g. file hash value or file content) to the HSM 118. The crypto-processor 120 may identify the key stored in the key store 122 using the key identifier and sign the file content using the key. In some examples, the key may be a private key 126.

In some examples, the processor 112 (or the crypto-processor 120) may encrypt the file using the private key 126 and append a digital certificate 136 to the encrypted file to obtain a signed file 138 (labeled as SIGNED_FILE 138). In some examples, the processor 112 may retrieve the digital certificate 136 from the certificate generation system 108 before signing the file. The digital certificate 136 may include a key (e.g., public key 124) corresponding to the key (e.g., private key 126) and an identity information of the key owner. For example, the processor 112 may send the public key 124 and a key owner identity to the certificate generation system 108. The certificate generation system 108 may facilitate a certificate authority (CA) 128 for issuing digital certificates. The CA 128 is a trusted third-party entity that provides a guarantee of the authorship of a file by authenticating the identity information and verifying the ownership of the public key of a file author of that file. In some examples, the CA 128 may maintain a CA public key 130 and a CA private key 132. The CA private key 132 may be kept private, while the CA public key 130 may be accessible to components external to the CA 128. In some examples, the certificate generation system 108 may include a dedicated hardware security module (not shown in the figure) for storing the keys, performing cryptographic operations, and performing key management services. The certificate authority 128 may verify the ownership of the public key 124 based on the key owner identity and generate a digital certificate 136. The digital certificate 136 may be signed using the CA private key 132, which is secure and inaccessible from components external to the certificate generation system 108.

The signed file 138 may be provided to the file author device 104 via the network 110. In some examples, the file author device 104 may publish the signed file 138 on a server 140. In some examples, the server 140 may be a device or system facilitating compute and/or data storage resources. The server 140 may host the signed files, such as software, multimedia, streaming services, that are downloadable on a client device (not shown in FIG. 1). The server 140 may be accessible by a plurality of client devices via a network similar to the network 110. The client devices may download the signed file 138 from the server 140. The client devices may be pre-installed with the CA public key 130, which may be used to decrypt the digital certificate 136 in the signed file 138. On decrypting the digital certificate 136, the public key 124 and the key owner identity may be obtained. Further, the public key 124 obtained from the digital certificate 136 may be used for decrypting the encrypted file or an encrypted hash value of the file to obtain a first hash value. Additionally, the downloaded file may also be hashed to obtain a second hash value. The client device may compare the first hash value and the second hash value. If the first and second hash values match, then the client device may verify that the file has not been tampered with and may install and execute. If the first and second hash values do not match, then the file is not installed and/or executed on the client device.

Figure 2:
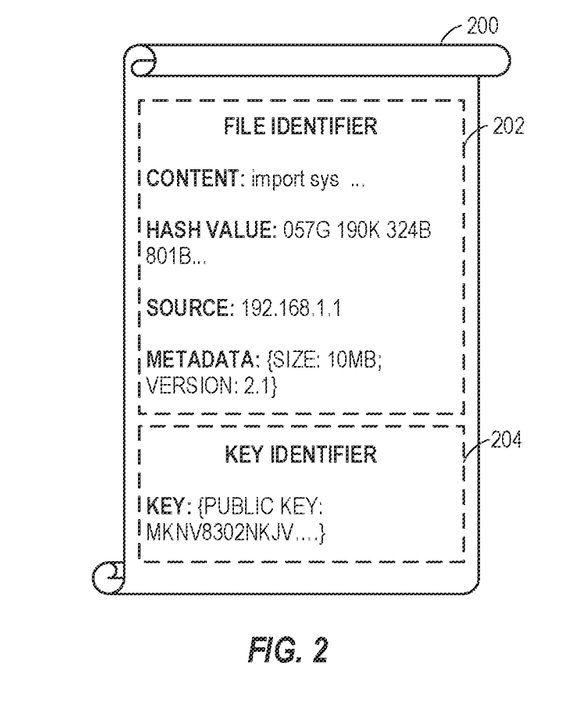
FIG. 2 depicts a signing request specification, in accordance with an example.

FIG. 2 depicts a signing request specification 200, in accordance with an example. The signing request specification 200 may include a file identifier 202 associated with the file. In some examples, the file identifier 202 may include one or more of the file content, a hash value, a file source, or a file metadata. The file content may include data recorded in the file. For example, the file content may include program code, text data, image data, spreadsheet data, and the like. The hash value may be a hash digest of the file content. The file source may include an Internet Protocol (IP) address, which may indicate a location and/or identity of the file author device. Further, the file metadata may include details about the file, such as size, version, author name, organization name, personalized comments, etc. Additionally, the signing request specification 200 may include a key identifier associated with a key stored in the HSM 118. The key identifier may indicate an identity of the key to be used for signing the file. In some examples, the key identifier may further include a corresponding key, which may be mathematically linked to the key. For example, if the key is a private key, then the corresponding key may be a public key associated with the key.

Figure 3:
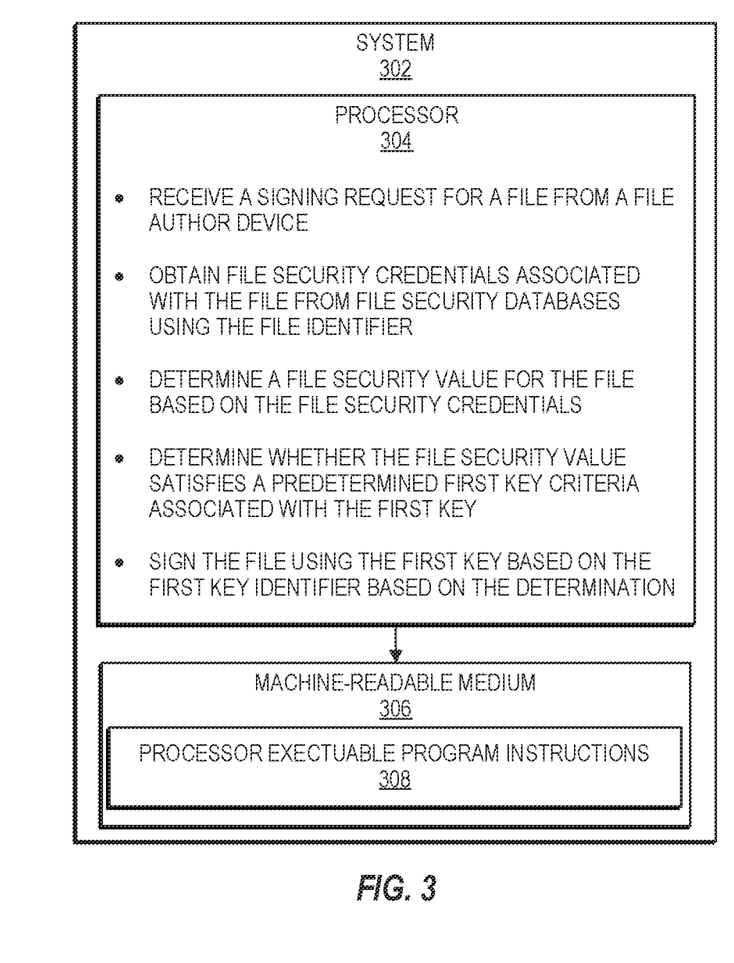
FIG. 3 depicts a system facilitating signing of files based on file security credentials, in accordance with an example.

FIG. 3 is a block diagram of the system 302 for signing files based on file security credentials, in accordance with an example. The system 302 may include a processor 304 and a machine-readable medium 306 storing executable program instructions 308. It should be noted herein that the system 302 referred to in FIG. 3 may represent one example of the system 102 described in relation to FIG. 1. In some examples, the processor 304 is operably coupled to the machine-readable medium 306. The processor 304 may include one or more physical processors. In some examples, the one or more physical processors may include the processor 112 and/or the crypto-processor 120 described in relation to FIG. 1. In some examples, the machine-readable medium 306 is non-transitory and is alternatively referred to as a non-transitory machine-readable medium. The machine-readable medium 306 referred to in FIG. 3 may represent one example of the machine-readable medium 114 described in relation to FIG. 1.

The processor 304 may execute program instructions for receiving a signing request 134 for a file that includes a file identifier 202 associated with the file and a first key identifier 204 associated with a first key. The first key (e.g., private key 126) may be one of the keys stored in the key store 122. In some examples, the signing request 134 may include only a file identifier 202. For instance, a file author may not specify the key identifier 204 to allow signing of the file by an appropriate key as determined by the signing system 102.

The processor 304 may execute program instructions for obtaining file security credentials associated with the file from one or more file security databases 106 using the file identifier 202. In some examples, the processor 304 may perform a lookup operation in one or more file security databases 106 storing the file security credentials using a hash value of the file. The hash value of the file may be generated using the file content (as indicated in the file identifier 202). The hash value may be provided in the lookup operation performed on the file security database 106. In response to the lookup operation, the processor 304 may receive the file security credentials from the file security database 106.

The processor 304 may execute program instructions for determining a file security value for the file based on the file security credentials. As discussed above, a security value may be assigned for each file security credential. The security value may be a predetermined value associated with a file security credential. For instance, if a file security credential (e.g., malware scan certification) indicates that the file was scanned for malware, then a predetermined value associated with malware scan may be assigned as a security value. On the other hand, if the file security credential does not include a malware scan certification indicating that the file was not scanned for malware, then another predetermined value may be assigned. Similarly, predetermined values associated with each file security credential may be assigned as security values. The overall file security value for the file may be calculated based on the individual security values for each file security credential (as will be described further in relation to FIG. 5A).

The processor 304 may execute program instructions for determining whether the file security value satisfies a predetermined first key criteria associated with the first key. In some examples, the predetermined first key criteria may include security and quality measures. The security and quality measures may include a range of key values (e.g., first key values) associated with a key (e.g., first key). The processor 304 may compare the file security value with the range of first key values and determine a match between the values. The range of first key values may be a predetermined range of first key values set by a key owner of the first key. In some examples, the predetermined range of first key values may include a minimum first key value and a maximum first key value. In other examples, the range of first key values may include values above or below a threshold first key value.

The processor 304 may execute program instructions for signing the file using the first key based on the first key identifier in response to the determination that the file security value is within the range of first key values. In some examples, the processor 304 may generate a hash value of the file content (e.g., in the example where file identifier includes a file content). The hash value may be encrypted using the private key. The encrypted hash value and the digital certificate 136 may be embedded in the file to obtain a signed file 138.

In the example where the signing request 134 does not include the key identifier 204, the processor 304 may execute program instructions for determining whether the file security value matches a range of key values associated with each key stored in the key store 122. The processor 304 may determine one or more keys that are associated with the range of key values matching with the file security value. The processor 304 may sign the file using one of the keys based on the determination.

Further, the processor 304 may execute program instructions for rejecting the signing request 134 in response to the determination that the file security value does not satisfy the predetermined first key criteria. The processor 304 may not sign the file and perform one or more suitable actions. For example, the processor 304 may suggest a second key identifier associated with a second key for signing the file if the file security value satisfies a predetermined second key criteria associated with the second key. In some examples, the processor 304 may provide a feedback to the file author device 104 for improving the file security value. The feedback may include requesting a change in the file security credentials to the file author device. In some examples, the processor 304 may apply a file security policy for the associated file to increase the file security value. The file security policy may refer to a set of rules to ensure that a subsequent signing request for a file is rejected unless one or more file security credentials are changed, or the file security value is improved. For example, the file security policy for a file may ensure that a corrective action is performed that may include one or more of scanning for malware, scanning for viruses, verifying a file source, or editing a file name, a file size, file extension, or the like.

Figure 4:
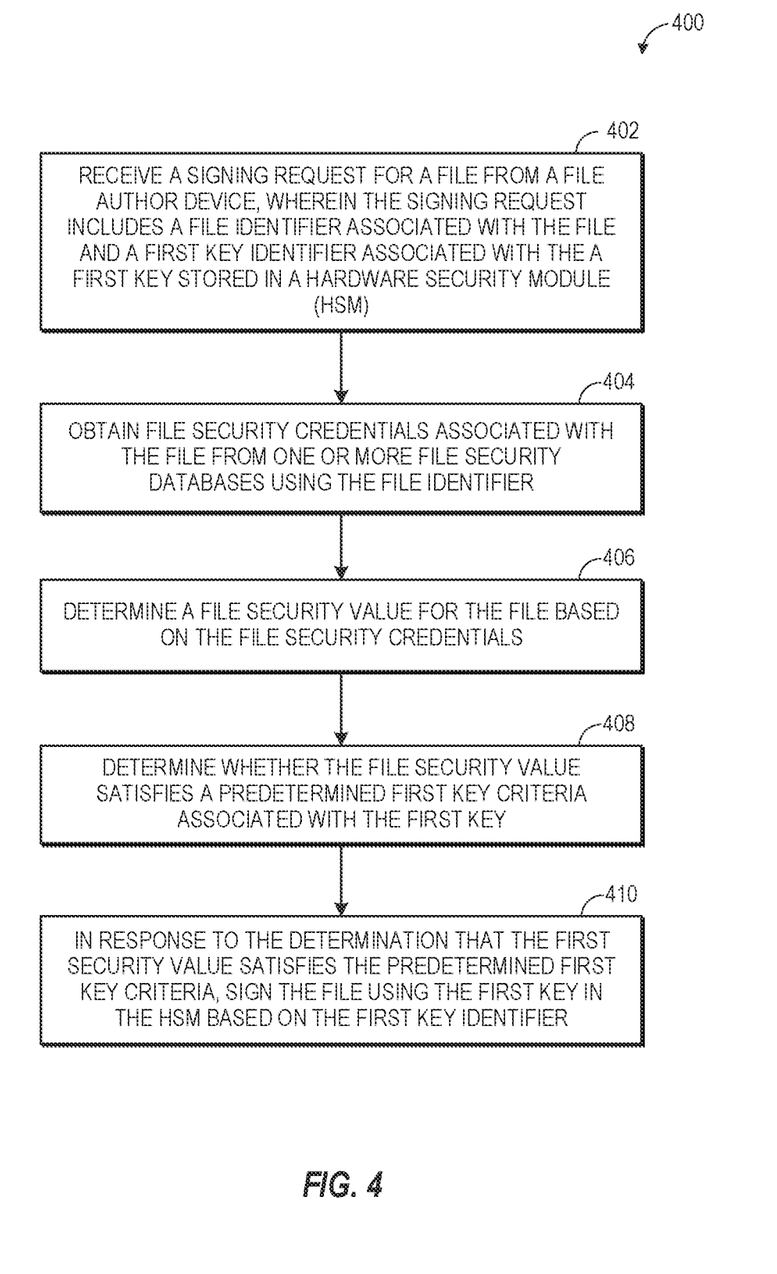
FIG. 4 is a flow diagram depicting a method for signing files based on file security credentials, in accordance with an example.

Moving now to FIG. 4, a flow diagram depicting a method 400 for signing files based on file security credentials is presented, in accordance with an example. For illustration purposes, the method 400 is described in conjunction with the network system 100 of FIG. 1, but the method 400 should not be construed to be limited to the example configuration of system 100. The method 400 may include method blocks 402, 404, 406, 408, and 410, (hereinafter collectively referred to as blocks 402-410) that may be performed by a processor-based system such as, for example, the system 102. In particular, operations at each of the method blocks 402-410 may be performed by the processor 112 and/or the crypto-processor 120 by executing the instructions 116 stored in the machine-readable medium 114 (see FIG. 1). In some other examples, the order of execution of the blocks 402-410 may be different than the order shown in FIG. 4. For example, the blocks 402-410 may be performed in series, in parallel, or in a series-parallel combination. Also, certain details of the operations performed by the processor 112 that are already described in FIG. 1 may not be repeated herein for the sake of brevity.

At block 402, the method 400 includes receiving a signing request 134 for a file from a file author device 104. The signing request 134 may include a file identifier (e.g., file identifier 202 in FIG. 2) associated with the file and a first key identifier (e.g., key identifier 204 in FIG. 2) associated with a first key (e.g., private key 126) stored in the HSM 118.

At block 404, the method 400 includes obtaining file security credentials associated with the file from one or more file security databases 106 using the file identifier 202. In some examples, a hash value of the file may be generated using the file identifier 202, which may include the file content, the file metadata, or any unique data associated with the file. The hash value may be generated using a hash function, which may be a mathematical algorithm that maps an input data (e.g., a file content) of arbitrary size to an output (e.g., hash value) of a fixed size. The hash value of the file may be a string of bits of a fixed size. Examples of hash functions may include MD5 (message digest), tabulation hashing, Pearson hashing, SHA functions (Secure Hash Algorithm), such as SHA-1, SHA-224, SHA-256, SHA-382, SHA-512, Rabin fingerprint, Zobrist hashing, and the like. A lookup operation in the file security databases 106 may be performed using the hash value to obtain the file security credentials.

At block 406, the method 400 includes determining a file security value for the file based on the file security credentials. In some examples, a security value may be assigned for each file security credential associated with the file (as described in relation to FIG. 3). The file security value may be determined based on the security value for each file security credential. For example, the file security value may be a sum of the security values, an average of the security values, a weighted average of the security values, and the like. In some examples, the computation of the file security value based on the security values may be associated with the key indicated in the key identifier. For example, i) for a first key, the file security value may be determined based on a sum of the security values; ii) for a second key, the file security value may be determined based on an average of the security values; iii) for a third key, the file security value may be determined based on a weighted average of the security values, and the like. In some examples, the computation method may be predefined for each key by the respective key owner.

At block 408, the method 400 includes determining whether the file security value satisfies a predetermined first key criteria associated with the first key. The predetermined first key criteria may include a range of first key values. In some examples, determining whether the file security value satisfies a predetermined first key criteria may include determining a match between the file security value and the range of first key values (as will be described further in relation to FIG. 5A).

At block 410, the method 400 includes signing the file using the first key in the HSM based on the first key identifier in response to the determination at block 408 that the first security value satisfies the predetermined first key criteria. For example, the first key in the HSM may be identified using the first key identifier and used for signing the file. In some examples, signing the file may include encrypting the file using the first key (e.g., private key 126). Further, signing the file may include appending a digital certificate (e.g., digital certificate 136) issued by a certificate generation system 108. In some examples, the digital certificate may include a first corresponding key (e.g., public key 124), which is mathematically related to the first key.

Figure 5A:
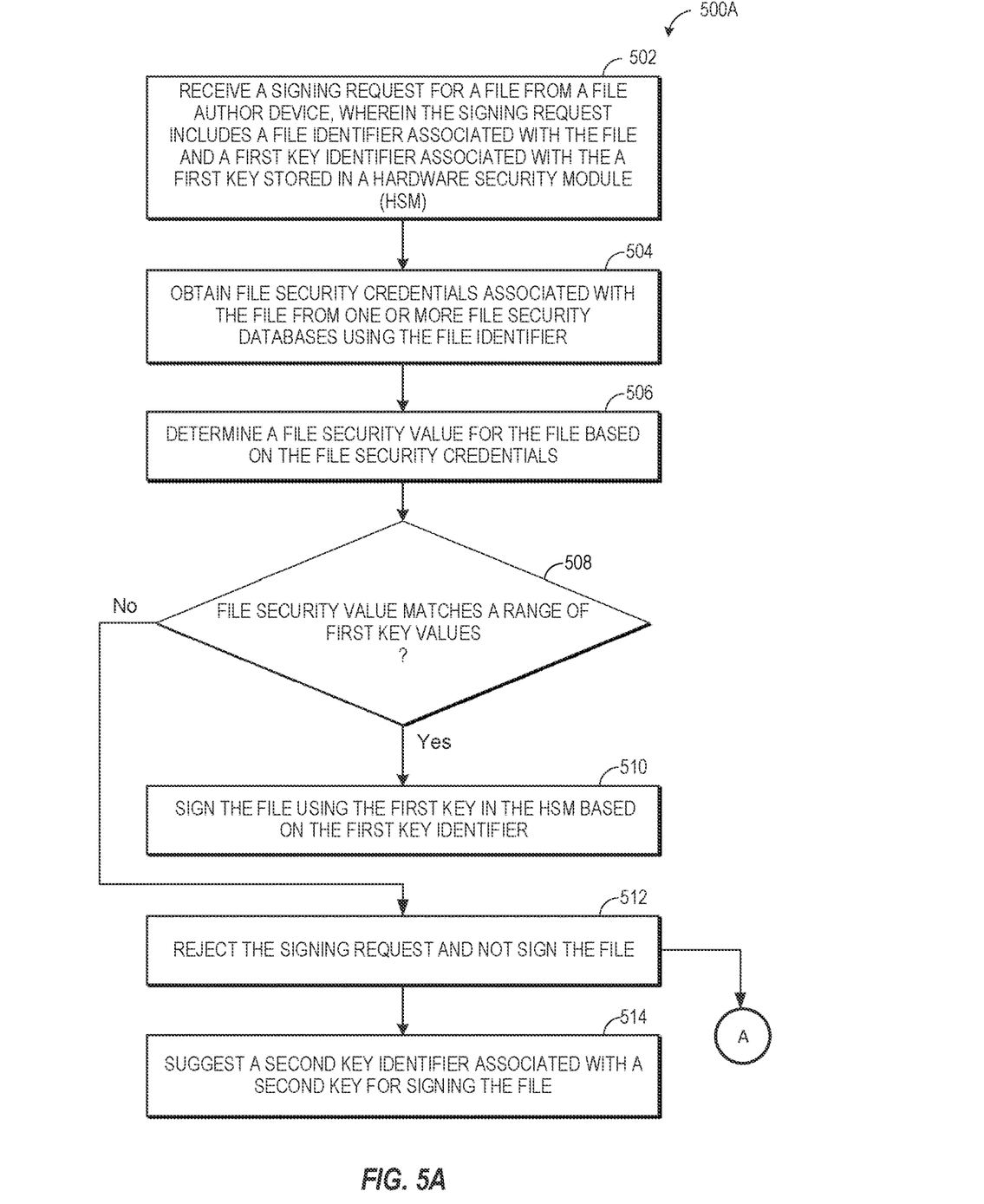
FIGS. 5A-5C are flow diagrams depicting a method for signing files based on file security credentials, in accordance with another example.
Figure 5B:
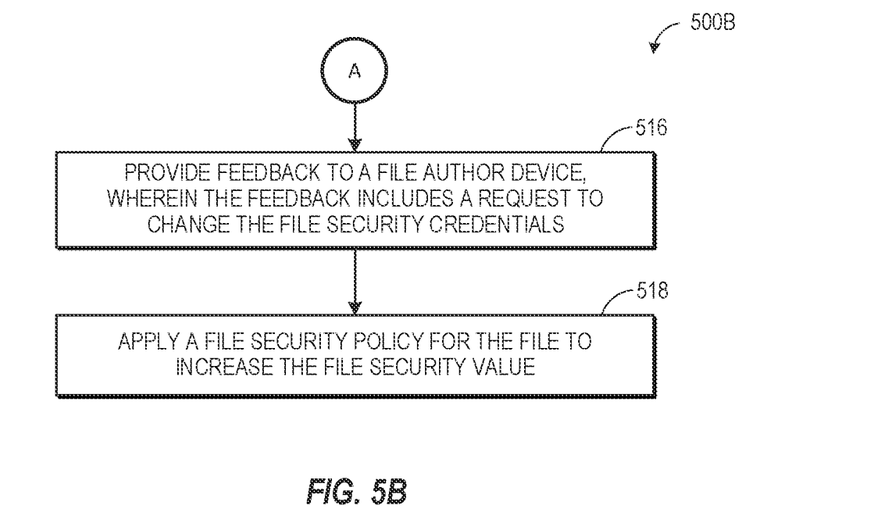
Figure 5C:
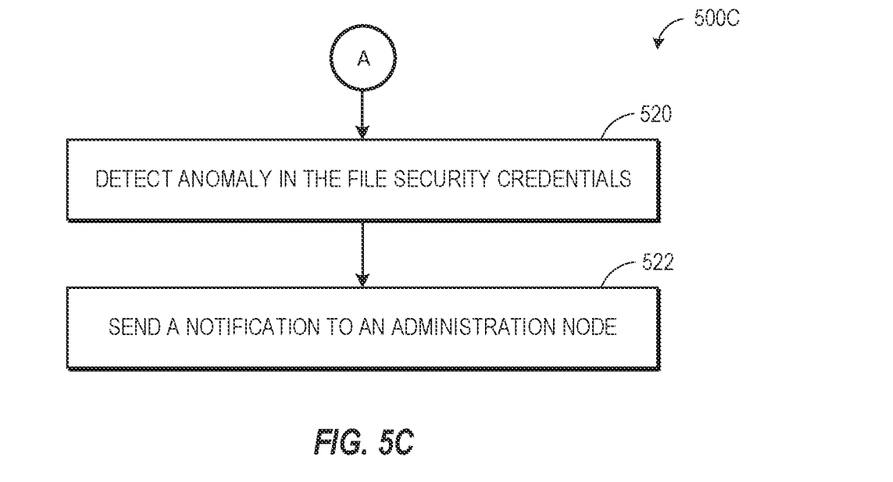

FIGS. 5A-5C are flow diagrams depicting methods 500A, 500B, and 500C for signing a file based on file security credentials, in accordance with an example. At block 502, the method 500A may include receiving a signing request for a file from a file author device 104. The signing request may include a file identifier 202 associated with the file and a first key identifier 204 associated with a first key (e.g., private key) stored in the HSM. The file identifier 202 may include a hash value of the file content and the first key identifier 204 may indicate a public key associated with the first key, for example.

At block 504, the method 500A may include obtaining file security credentials associated with the file from one or more file security databases 106 using the file identifier 202. For example, the hash value may be provided as an input in a lookup operation on the file security database 106. In some examples, the file security database 106 may use the hash value to identify the file security credentials associated with the file. The file security database 106 may provide the file security credentials to the system 102 in response to the lookup operation.

At block 506, the method 500A may include determining a file security value for the file based on the file security credentials. The file security value may be derived from the security values assigned for each file security credential. The security value may be a predetermined value associated with a file security credential. Table 1 depicts example predetermined values assigned as security values for each file security credential associated with the file. As depicted, if the file security credential includes a malware scan certification (i.e., malware scan is TRUE), then a first security value of '40' may be assigned. Similarly, a second security value of '20' may be assigned, if the file security credential includes virus scan certification (i.e., virus scan is TRUE). A third security value of '20' may be assigned if the file security credentials include secure build server certification (i.e., secure build server product is TRUE). A fourth security value of '20' may be assigned if the signing request was sent by an authorized file author (i.e., authorized file author is TRUE). If the file security credential indicates that the file was not scanned for malware (i.e., malware scan is FALSE), was not scanned for virus (i.e., virus scan is FALSE), was not developed on a secure build server (i.e., secure build server product is FALSE), or the signing request was not sent by an authorized file author (i.e., authorized file author is FALSE), then a security value of '0' may be assigned for each file security credential, for example.

TABLE 1

Example of predetermined values assigned as security
value for each file security credential

| File security credentials | TRUE | FALSE |
|---|---|---|
| Malware scan certification | 40 | 0 |
| Virus scan certification | 20 | 0 |
| Secure build server product | 20 | 0 |
| Authorized file author | 20 | 0 |

The file security credentials of each file may be different. For example, the file security credentials of File A may include malware scan certification, virus scan certification, and an authorized file author. The file security credentials of File B may include virus scan certification and secure build server certification. Table 2 below depicts an example security value assignment for two files—File A and File B.

TABLE 2

Example security value assignment for each file
security credential for File A and File B

| File security credentials (Predetermined security value) | Security values for File A | Security values for File B |
|---|---|---|
| Malware scan certification (TRUE = 40, FALSE = 0) | 40 | 0 |
| Virus scan certification (TRUE = 20, FALSE = 0) | 20 | 20 |
| Secure Build server product (TRUE = 20, FALSE = 0) | 0 | 20 |
| Authorized file author (TRUE = 20, FALSE = 0) | 20 | 0 |

As depicted in Table 2 and as discussed earlier, the file security credentials of File A include malware scan certification, therefore, a first security value of '40' is assigned. Further, the file security credentials of File A include a virus scan certification and an authorized file author, therefore, a second security value of '20' and a fourth security value of '20' are assigned. As the file security credentials of File A do not include a secure build server certification, a third security value of '0' is assigned. Similarly, the file security credentials of File B includes only a virus scan certification and secure build server certification, therefore, a first security value of '0', a second security value of '20', a third security value of '20', and a fourth security value of '0' are assigned.

The file security value of File A and File B may be determined based on the assigned security values. For example, the file security value may be a sum of the security values. Based on the sum of the security values of the file security credentials, the file security value of File A is '80' and that of File B is '40'. In some examples, the file security values may be an average or weighted average of the security values.

At block 508, the method 500A may include determining whether the file security value is in the range of first key values. In some examples, the range of first key values may be set by a key owner of the first key. The range of first key values may be set to ensure that only a file with a file security value within that range is signed. For example, the range of first key values may be '60-100'. As depicted in Table 3, the method 500A may determine that the file security value of File A is within the range of the first key values and that the file security value of File B is not within the range of the first key values.

TABLE 3

Determining match between file security
value and range of key values

| Key | Range of key values | File A (File security value = 80) | File B (File security value = 40) |
|---|---|---|---|
| First key | (60-100) | TRUE | FALSE |
| Second key | (>20) | TRUE | TRUE |

At block 510, the method 500A may include signing the file using the first key in the HSM based on the first key identifier if the first security value matches with the range of first key values. For example, the method may include signing the File A using the first key from the earlier example. File A may be encrypted using the first key, and a digital certificate may be appended to the encrypted file to obtain a signed File A.

At block 512, the method 500A may include rejecting the signing request and not signing the file if the file security value does not match a range of values at block 508. For example, the signing request for File B may be rejected and File B may not be signed with the first key.

At block 514, the method 500A may include suggesting a second key identifier associated with a second key based on the file security value of File B. The method 500A may identify a predetermined second key criteria, which may include a range of second key values, based on the file security value of File B. The identification may be performed such that the file security value of File B is within the range of the second key values. For example, a second key with a range of second key values (e.g., greater than 20) may be identified. As the file security value of File B (40) is greater than 20, a second key identifier associated with the second key may be suggested in response to the rejection of the signing request for the File B, for example. A separate signing request including the file identifier and the second key identifier may be received from the file author device 104.

As depicted in FIG. 5B, at block 516, the method 500B may include providing a feedback to the file author device 104. The feedback may include a request to change the file security credentials. For example, a request to perform a malware scan for the File B may be provided to the file author device 104 in response to rejecting the File B at block 512. At block 518, the method 500B may include applying a file security policy for the File B to increase the file security value. The file security policy may refer to a set of rules to ensure that a subsequent signing request for a file (e.g., File B) is rejected unless one or more file security credentials are changed, or the file security value is improved. The file security policy for a file may ensure that a corrective action is performed to improve the file security value. The corrective actions may include one or more of scanning for malware, scanning for viruses, verifying a file source, or editing a file name, a file size, file extension, or the like. For example, a rule may be applied to reject the signing of File B with the first key unless File B was scanned for malware, i.e., the file security value was increased such that it lies within the range of the first key values (60-100).

As depicted in FIG. 5C, at block 520, the method 500C may include detecting an anomaly in the file security credentials. The term "anomaly" may refer to an unusual, suspicious, incongruous characteristic of a file of file identifier. For example, the anomaly may be associated with a file name (an unusual file name), a file size (a very large or small file size), a file extension (".COM" extension), a file author, file source, file content, and the like. The anomaly detection may be performed using a machine learning model. The machine learning model may be trained using learning methods from supervised learning, unsupervised learning, semi-supervised learning techniques, etc. Examples of learning methods may include, but not limited to, random forest, neural networks, linear regression, logistic regression, linear discriminant analysis, support vector machines, decision tree, linear SVM, naïve bayes, hierarchical clustering, k-means, and the like. The machine learning model may be trained using historical data associated with signing requests, files, file identifiers, and the like. At block 522, a notification about the detected anomaly may be sent to an administration node for analysis. In some examples, an administration node may be a computing system or device in the network (e.g., network 110 of FIG. 1) capable of performing analyses to determine information about the file. For example, the administration node may determine the file author, file source, any threats, a root-cause, associated with the anomaly.

Figure 6:
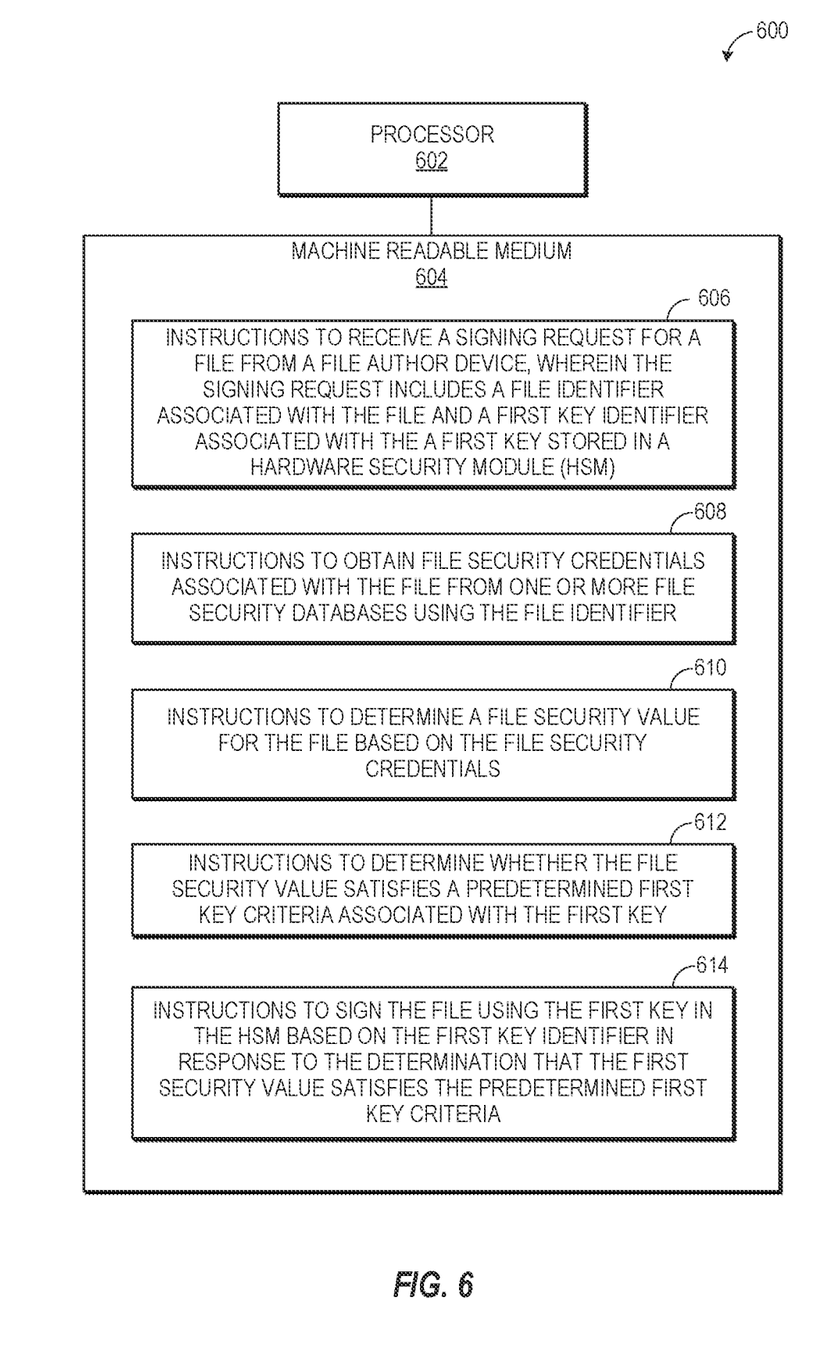
FIG. 6 is a block diagram depicting a processor and a machine-readable medium encoded with example instructions to sign files based on file security credentials, in accordance with an example.

Moving to FIG. 6, a block diagram 600 depicting a processor 602 and a machine-readable medium 604 encoded with example instructions to facilitate the signing of files based on file security credentials is presented, in accordance with an example. The machine-readable medium 604 may be non-transitory and is alternatively referred to as a non-transitory machine-readable medium 604. As described in detail herein, the machine-readable medium 604 may be encoded with executable instructions 606, 608, 610, 612, and 614 (hereinafter collectively referred to as instructions 606-614) for performing the method 400 described in FIG. 4. Although not shown, in some examples, the machine-readable medium 604 may be encoded with certain additional executable instructions to perform the method 400 of FIG. 4, and/or any other operations performed by the system 102, without limiting the scope of the present disclosure. In some examples, the machine-readable medium 604 may be accessed by the processor 602. In some examples, the processor 602 may represent one example of the processor 112 of the system 102. Further, the machine-readable medium 604 may represent one example of the machine-readable medium 114 of the system 102. In some examples, the processor 602 may fetch, decode, and execute the instructions 606-614 stored in the machine-readable medium 604 to perform signing of files based on file security credentials.

The instructions 606 when executed by the processor 602 may cause the processor 602 to receive a signing request for a file from a file author device. The signing request may include a file identifier associated with the file and a first key identifier associated with a first key stored in the HSM. Further, the instructions 608 when executed by the processor 602 may cause the processor 602 to obtain file security credentials associated with the file from one or more file security databases using the file identifier. Furthermore, the instructions 610 when executed by the processor 602 may cause the processor 602 to determine a file security value for the file based on the file security credentials. Moreover, the instructions 612 when executed by the processor 602 may cause the processor 602 to determine whether the file security value satisfies a predetermined first key criteria associated with the first key. The instructions 614 when executed by the processor 602 may cause the processor 602 to sign the file using the first key in the HSM based on the first key identifier in response to the determination that the first security value satisfies the predetermined first key criteria.

Examples are described herein with reference to FIGS. 1-6. It should be noted that the description and figures merely illustrate the principles of the present subject matter along with examples described herein and should not be construed as limiting the present subject matter. Although some examples may be described herein with reference to a single signing system, examples may be utilized for several signing systems. Furthermore, any functionality described herein as performed by a component (e.g., a processor, an HSM, or a file author device) may be performed by at least one processor of the component executing instructions (stored on a machine-readable storage medium) to perform the functionalities described herein. Various implementations of the present subject matter have been described below by referring to several examples.

In examples described herein, functionalities described as being performed by "instructions" may be understood as functionalities that may be performed by those instructions when executed by a processor. In other examples, functionalities described in relation to instructions may be implemented by any combination of hardware and programming.

As used herein, the network system may be a distributed system where components of the network system, i.e., the system, the file author device, the file security database, and the certificate generation system, are located at physically different locations (e.g., on different racks, on different enclosures, in different buildings, in different cities, in different countries, and the like) while being communicatively coupled via the network. In other examples, the system, the file author device, the file security database, the certificate generation system, may be co-located in the same or similar location (e.g., same system, same enclosure, or same geographical location). For example, one or more of the components may be components of the system. Moreover, in some examples, the network system in any form, be it a distributed system or in a co-location system, may be capable of being reconfigured by adding or removing the components and/or by adding or removing internal resources (e.g., compute, storage, network resources, etc.) to and from the components.

As used herein, the system may be a system or a device including a processor or microcontroller and/or any other electronic component, or a system or a device that may facilitate various compute and/or data storage services, for example. For explanation purposes, the system may also be referred to as a processor-based system. In FIG. 1, although the network system is shown to include one signing system, the network system may include any number of signing systems, without limiting the scope of the present disclosure. The signing systems may have similar or varying hardware and/or software configurations in a given implementation of the network system. Examples of the system may include, but not limited to, a desktop computer, a laptop, a smartphone, a server, a computer appliance, a workstation, a storage system, or a converged or hyperconverged system, and the like that is configured to manage signing of files based on file security credentials (as will be described further below). Further, in certain examples, the system may be or may include a virtual machine or a containerized application executing on hardware in the network system.

As used herein, the machine-readable medium may be any electronic, magnetic, optical, or other physical storage devices that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CD-ROM), and the like. The machine-readable medium may be non-transitory. As described in detail herein, the machine-readable medium may be encoded with the executable instructions to perform one or more methods, for example, methods described in FIGS. 4, 5A, 5B, and SC. Further, the processor may be a physical device, for example, one or more central processing unit (CPU), one or more semiconductor-based microprocessors, one or more graphics processing unit (GPU), application-specific integrated circuit (ASIC), a field-programmable gate array (FPGA), other hardware devices capable of retrieving and executing instructions stored in the machine-readable medium, or combinations thereof. The processor may fetch, decode, and execute the instructions stored in the machine-readable medium to perform signing of files based on file security credentials. As an alternative or in addition to executing the instructions, the processor may include at least one integrated circuit (IC), control logic, electronic circuits, or combinations thereof that include a number of electronic components for performing the functionalities intended to be performed by the system.

As used herein, the network may include, but not limited to, an Internet Protocol (IP) or non-IP-based local area network (LAN), wireless LAN (WLAN), metropolitan area network (MAN), wide area network (WAN), a storage area network (SAN), a personal area network (PAN), and the Internet. In some examples, the network may include one or more network switches, routers, or network gateways to facilitate data communication. Communication over the network may be performed in accordance with various communication protocols including, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless (e.g., Wi-Fi®, cellular communication, satellite communication, Bluetooth, etc.) communication technologies. In some examples, the network may be enabled via private communication links including, but not limited to, communication links established via Virtual Private Network (VPN), Bluetooth, cellular communication, optical communication, radio frequency communication, wired (e.g., copper), and the like. In some examples, the private communication links may be direct communication links between the system, the file author device, the file security database, and the certificate generation system.

As used herein, the file author device may be a device or a system including a processor or microcontroller and/or any other electronic component, device, or system that may facilitate various file creation and development, compute, and/or data storage services. Examples of the file author device may include, but are not limited to, a desktop computer, a laptop, a smartphone, a workstation, a server, a computer appliance, a storage system, or a converged or hyperconverged system, and the like. In FIG. 1, although the network system is shown to include one file author device, the network system may include any number of file author devices, without limiting the scope of the present disclosure. In such a network system, the file author devices may have similar or varying hardware and/or software configurations in a given implementation of the network system.

As used herein, the term "file" may include an executable, a document, a message, an image, a video, and the like. An executable may include an application (e.g., software program), a virtual machine (VM), a containerized application (e.g., in the form of a container or a pod of containers), or any piece of code that may be developed as a microservice. As will be understood, a file such as a VM may be an instance of an operating system hosted on a given computing node via a VM host program, such as a hypervisor. Further, a file such as a container may be a packaged application with its dependencies (e.g., operating system resources, processing allocations, memory allocations, etc.) hosted on a given computing node via a container host programs, such as a container runtime (e.g., Docker Engine), for example. Further, in some examples, a file may include a pod that may be formed by grouping one or more containers. For example, a set of containers that are associated with a common application may be grouped to form a pod.

As used herein, the file security database may be a relational database, which may store and organize data in tables. A given table in the relational database may include columns associated with keys and rows associated with values for the keys. For example, the keys may include a file identifier and the values may include the file security credentials of the file. On receiving a query containing one or more keys, the file security database may provide the values associated with the one or more keys as a response to the query.

As used herein, the HSM may be a physical device facilitating compute, storage, and management of cryptographic services. The HSM may provide a tamper-proof enclosure such that the device is partially or wholly resistant to tampering. In some examples, the HSM may show visible evidence of tampering or attempts of tampering, and perform tamper-responsive functions, such as deletion of data stored in the HSM on detection of the tampering. The HSM may include specialized hardware, firmware, and instructions to facilitate a secure operational environment within the HSM. The specialized hardware components may include one or more crypto-processors capable of performing cryptographic operations, such as encryption, decryption, hashing, and the like. Additionally, the HSM may include a crypto-accelerator or crypto-coprocessor (not shown in FIG. 1) capable of performing computationally intensive cryptographic operations. In some examples, the processor and the crypto-processor may operate independently or in combination to perform the signing of files using file security credentials. Further, the HSM may include memory and storage components capable of storing data and instructions, which are not accessible by components external to the HSM. In some examples, the HSM may include secure storage components for storing keys and one or more of the instructions stored in a machine-readable medium.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
receiving, by a processor-based system, a signing request for a file from a file author device, wherein the signing request includes a file identifier based on a content of the file and a first key identifier associated with a first key stored in a key store;
obtaining, by the processor-based system, file security credentials associated with the file from one or more file security databases using the file identifier, wherein the file security credentials comprise a malware scan certification and a secure build server certification;
obtaining respective individual security values assigned to the file security credentials, wherein the obtaining comprises:
assigning a first security value to the malware scan certification based on a malware scan having been performed on the file, and
assigning a second security value to the secure build server certification based on the file being developed on a secure build server;
determining, by the processor-based system, a file security value for the file based on the individual security values for the file security credentials, the individual security values comprising the first security value and the second security value;
determining, by the processor-based system, whether the file security value satisfies a predetermined first key criteria associated with the first key; and
based on a determination that the file security value satisfies the predetermined first key criteria, signing, by the processor-based system, the file using the first key responsive to the signing request.

2. The method of claim 1, wherein the obtaining of the file security credentials comprises:
generating, by the processor-based system, a hash value by applying a hash function on the content of the file, wherein the file identifier comprises the hash value;
requesting, by the processor-based system, a lookup in the one or more file security databases using the hash value; and
receiving, by the processor-based system, the file security credentials from the one or more file security databases based on the lookup of the one or more file security databases using the hash value.

3. The method of claim 1, wherein the determining of the file security value for the file comprises:
obtaining the individual security values assigned to the file security credentials; and
computing a combination of the individual security values to produce the file security value for the file.

4. The method of claim 3, wherein a security value assigned to the malware scan certification is based on whether the malware scan was performed on the file, the first security value corresponds to the malware scan having been performed on the file, and a third security value different from the first security value corresponds to the malware scan not having been performed on the file, and
wherein a security value assigned to the secure build server certification is based on whether the file was developed on the secure build server, the second security value corresponds to the file being developed on the secure build server, and a fourth security value different from the second security value corresponds to the file not being developed on the secure build server.

5. The method of claim 3, wherein the computing of the combination of the individual security values comprises computing a sum, an average, or a weighted average of the individual security values.

6. The method of claim 1, wherein the predetermined first key criteria comprises a range of first key values, and wherein the determining of whether the file security value satisfies the predetermined first key criteria comprises determining a match between the file security value and the range of first key values.

7. The method of claim 1, wherein the signing of the file comprises:
encrypting, by the processor-based system, the file using the first key; and
appending, by the processor-based system, a digital certificate issued by a certificate generation system, wherein the digital certificate includes a first corresponding key associated with the first key.

8. The method of claim 1, wherein the file security credentials further comprise an authorized file author certification, and the obtaining of the respective individual security values further comprises:
assigning a third security value to the authorized file author certification based on an author of the file being authorized, wherein the individual security values further comprise the third security value.

9. The method of claim 1, further comprising:
receiving, by the processor-based system, a further signing request for a further file from the file author device, wherein the further signing request includes a further file identifier based on a content of the further file and the first key identifier associated with the first key stored in the key store;
obtaining, by the processor-based system, further file security credentials associated with the further file from the one or more file security databases using the further file identifier;
determining, by the processor-based system, a further file security value for the further file based on the further file security credentials;
determining, by the processor-based system, whether the further file security value satisfies the predetermined first key criteria associated with the first key; and
based on a determination that the further file security value does not satisfy the predetermined first key criteria, rejecting, by the processor-based system, the further signing request and not signing the further file.

10. The method of claim 9, further comprising:
based on the determination that the further file security value does not satisfy the predetermined first key criteria, applying a file security policy for the further file to increase the further file security value, wherein the applying of the file security policy comprises performing a corrective action including one or more of scanning for malware, verifying a file source, or editing a file name, a file size, or file extension.

11. The method of claim 9, further comprising:
based on the determination that the further file security value does not satisfy the predetermined first key criteria, suggesting, by the processor-based system, a second key identifier associated with a second key for signing the further file, wherein the further file security value satisfies a predetermined second key criteria associated with the second key.

12. The method of claim 1, wherein the first key is stored in the key store of a hardware security module (HSM) that further comprises a crypto-processor.

13. The method of claim 1, wherein the file comprises one of an application program, a firmware, a read-only memory (ROM) file, a document, an image, a script, or a containerized application.

14. A system comprising:
a processor;
a non-transitory machine-readable medium storing instructions that, when executed on the processor, cause the system to:
receive a signing request for a file from a file author device, wherein the signing request includes a file identifier based on a content of the file and a first key identifier associated with a first key stored in a key store;
obtain file security credentials associated with the file from one or more file security databases using the file identifier, wherein the file security credentials comprise a malware scan certification and a secure build server certification;
obtain respective individual security values assigned to the file security credentials, wherein the obtaining comprises:
assigning a first security value to the malware scan certification based on a malware scan having been performed on the file, and
assigning a second security value to the secure build server certification based on the file being developed on a secure build server;
derive a file security value for the file based on computing a combination of the individual security values for the file security credentials, the individual security values comprising the first security value and the second security value;
determine whether the file security value satisfies a predetermined first key criteria associated with the first key; and
based on a determination that the file security value satisfies the predetermined first key criteria, sign, for the signing request, the file using the first key.

15. The system of claim 14, wherein the combination of the individual security values comprises a sum, an average, or a weighted average of the individual security values.

16. The system of claim 14, wherein a security value assigned to the malware scan certification is based on whether the malware scan was performed on the file, the first security value corresponds to the malware scan having been performed on the file, and a third security value different from the first security value corresponds to the malware scan not having been performed on the file, and
wherein a security value assigned to the secure build server certification is based on whether the file was developed on the secure build server, the second security value corresponds to the file being developed on the secure build server, and a fourth security value different from the second security value corresponds to the file not being developed on the secure build server.

17. The system of claim 16, wherein the file security credentials further comprise an authorized file author certification, and the obtaining of the respective individual security values further comprises:
assigning a third security value to the authorized file author certification based on an author of the file being authorized, wherein the individual security values further comprise the third security value.

18. The system of claim 14, wherein the instructions when executed cause the system to:
receive a further signing request for a further file from the file author device, wherein the further signing request includes a further file identifier based on a content of the further file and the first key identifier associated with the first key stored in the key store;
obtain further file security credentials associated with the further file from the one or more file security databases using the further file identifier;
derive a further file security value for the further file based on computing a combination of individual security values for the further file security credentials;
determine whether the further file security value satisfies the predetermined first key criteria associated with the first key; and
based on a determination that the further file security value does not satisfy the predetermined first key criteria,
reject the further signing request and not sign the further file, and
suggest a second key identifier associated with a second key for signing the further file, wherein the further file security value satisfies a predetermined second key criteria associated with the second key.

19. A non-transitory machine-readable medium storing instructions that upon execution cause a system to:
receive a signing request for a file from a file author device, wherein the signing request includes a file identifier based on a content of the file and a first key identifier associated with a first key stored in a key store;
obtain file security credentials associated with the file from one or more file security databases by looking up the one or more file security databases using the file identifier that is based on the content of the file, wherein the file security credentials comprise a malware scan certification and a secure build server certification;
obtain respective individual security values assigned to the file security credentials, wherein the obtaining comprises:
assigning a first security value to the malware scan certification based on a malware scan having been performed on the file, and
assigning a second security value to the secure build server certification based on the file being developed on a secure build server;
determine a file security value for the file based on the individual security values for the file security credentials, the individual security values comprising the first security value and the second security value;
determine whether the file security value satisfies a predetermined first key criteria associated with the first key; and
based on a determination that the file security value satisfies the predetermined first key criteria, sign the file using the first key responsive to the signing request.

20. The non-transitory machine-readable medium of claim 19, wherein the determining of the file security value is based on computing a sum, an average, or a weighted average of the individual security values.

* * * * *